United States Patent [19]

Kumpati

[11] Patent Number: 4,774,661
[45] Date of Patent: Sep. 27, 1988

[54] DATABASE MANAGEMENT SYSTEM WITH ACTIVE DATA DICTIONARY

[75] Inventor: Murari Kumpati, Thornton, Colo.

[73] Assignee: American Telephone and Telegraph Company, AT&T Information Systems, Holmdel, N.J.

[21] Appl. No.: 799,061

[22] Filed: Nov. 19, 1985

[51] Int. Cl.$^4$ .............................................. G06F 15/40
[52] U.S. Cl. ...................................... 364/300; 364/900
[58] Field of Search ................ 364/200 MS File, 300, 364/900 MS File

[56] References Cited

U.S. PATENT DOCUMENTS 4,476,528 10/1984 Matsumoto et al. ................. 364/200
4,558,413 12/1985 Schmidt et al. ....................... 364/300

OTHER PUBLICATIONS

Batchelor et al., "Automatic Database Dictionary Creation and Maintenance During Program Creation or Modification", IBM Technical Disclosure Bulletin, vol. 26, No. 5, Oct. 1983, pp. 2466-2475.

Primary Examiner—Gareth D. Shaw
Assistant Examiner—Rebecca L. Adams
Attorney, Agent, or Firm—John C. Moran

[57] ABSTRACT

This invention pertains to database management systems and, in particular, to a database management system which has an active data dictionary that the user can both access and modify. The user makes use of simple commands to control, order and query not only the underlying data controlled by the database management system but also the contents of the data dictionary. This capability enables the user to write generic application programs which are logically independent of the data since the subject database management system enables the user/application program to access all data in the database independent of each application program's data model.

5 Claims, 8 Drawing Sheets

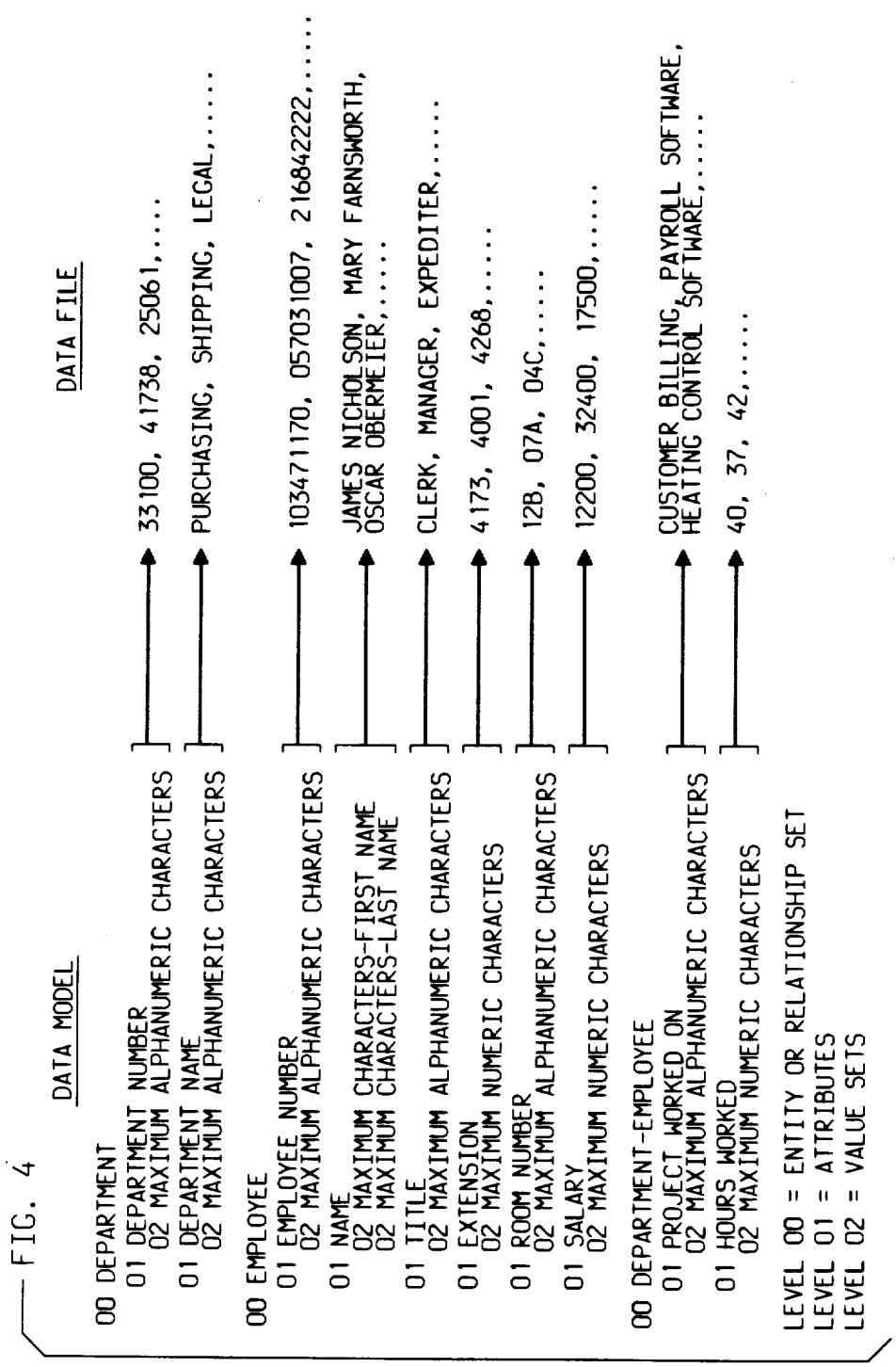

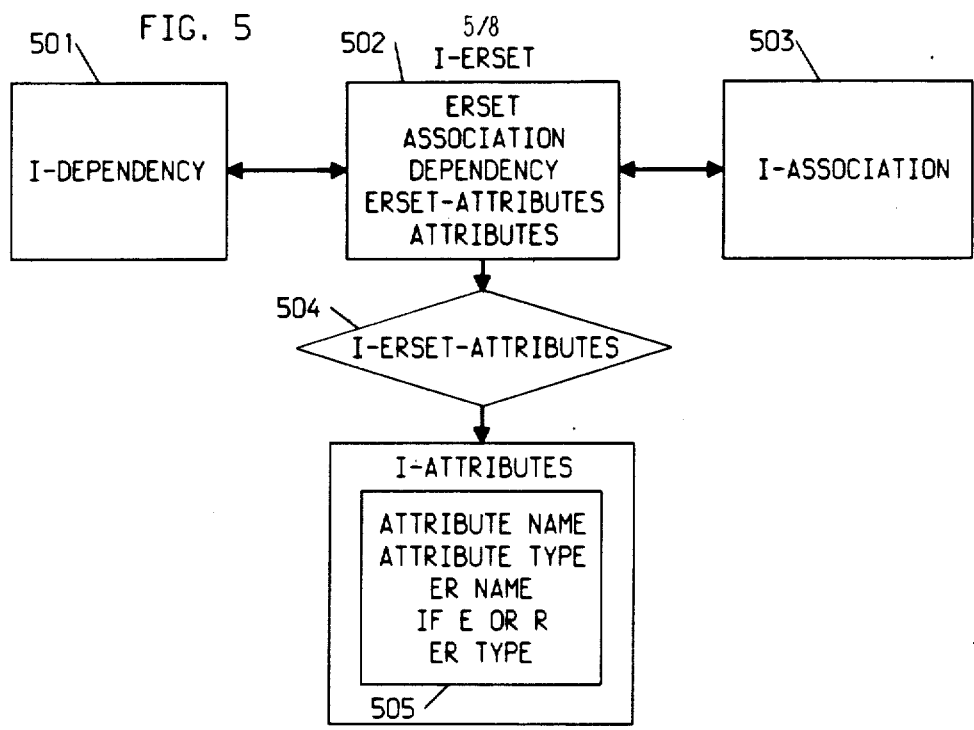
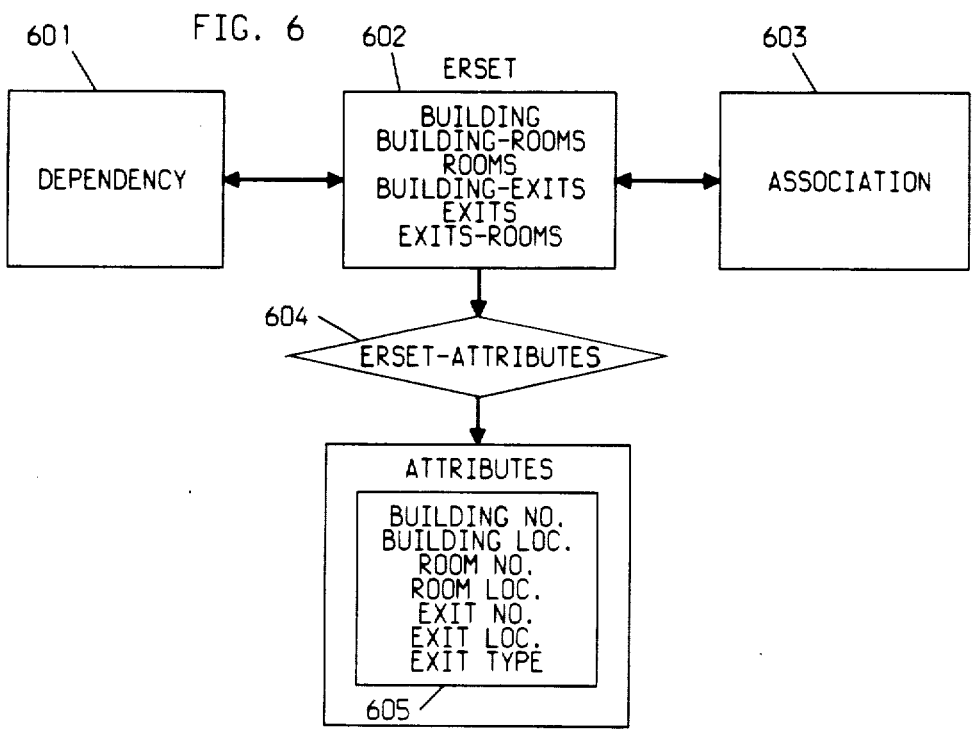

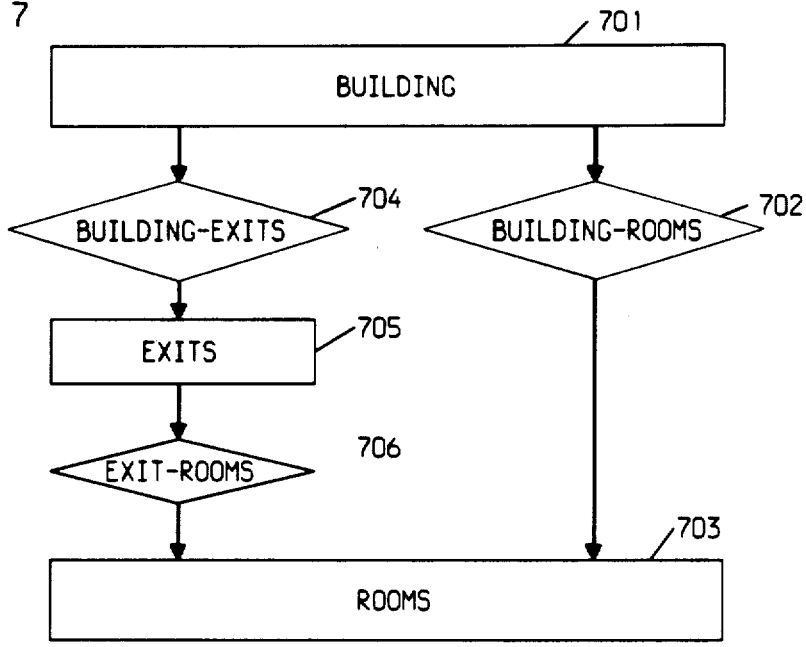
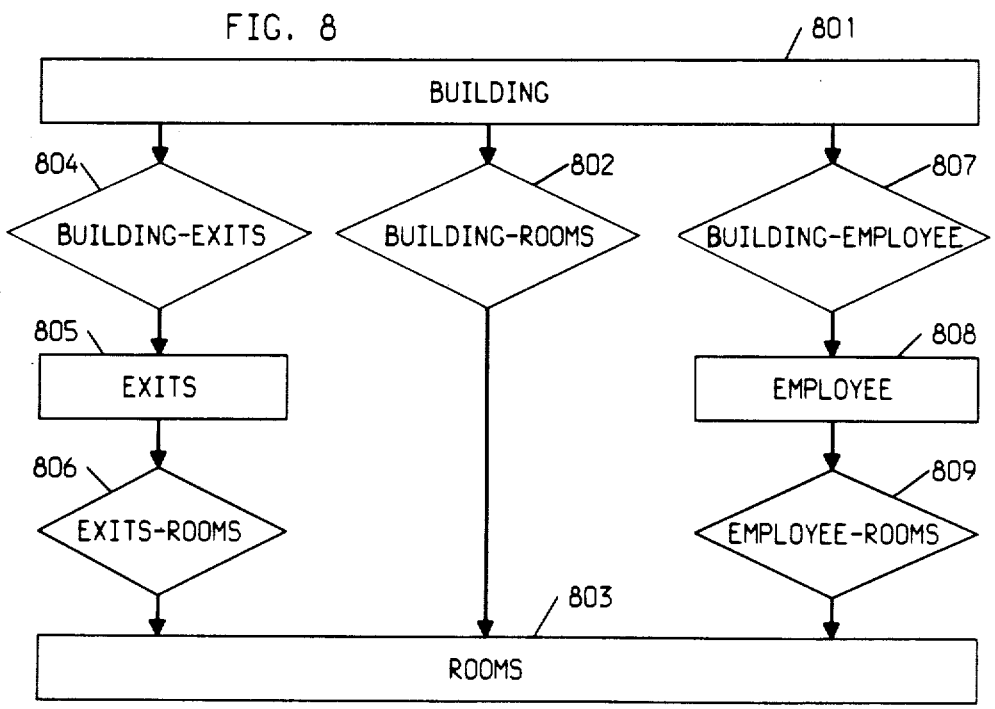

DATABASE MANAGEMENT SYSTEM WITH ACTIVE DATA DICTIONARY

REFERENCE TO A MICROFICHE APPENDIX

This application contains a set of microfiche appendices, designated A-J, which list program instructions incorporated in the disclosed database management system. The total number of microfiche is 25 sheets and the total number of frames is 937.

FIELD OF THE INVENTION

This invention pertains to database management systems and, in particular, to a database management system which has an active data dictionary that the user can both access and modify. The user makes use of simple commands to control, order and query not only the underlying data controlled by the database management system but also the contents of the data dictionary. This capability enables the user to write generic application programs which are logically independent of the data since the subject database management system enables the user/application program to access all data in the database independent of each application program's entity-relationship data model.

BACKGROUND OF THE INVENTION

A significant problem in computer systems is the efficient use and management of the data stored in memory. The earliest computers maintained an independent file or database for the exclusive use of each program which ran on the computer. The difficulty with this arrangement is that for similar application programs, the databases maintained by each of these programs contained a significant amount of data redundancy.

The solution to this problem is the creation of a common database representing the collection of all interrelated data to serve a number of application programs. The data is stored in the database in an order or arrangement which is independent of the ordering of the data in the application programs which use the data.

Within each computer is a database management system which is a set of program instructions to manage this data and to function as an interface between the data and the application programs requesting access to the data. The database management system interface function is accomplished by a structure known as a schema. The schema is a mapping or a data model for the database. The schema indicates which elements in the database are required for use by a particular application program. In this fashion, the database management system isolates users from each other, since each application program accesses the common database through the schema which is maintained in the database management system for that particular application program. The schema permits access only to the data required for the operation of each application program.

Each database management system has its own architecture which relates to the physical structure and organization of the memory devices which are controlled by the database management system. The architecture also defines the logical interconnection and interrelation of the various files, records, record segments and schemas within the common database. This architecture is defined at the time the database is created and is reflected in an entity contained in each database management system called the data dictionary.

The data dictionary is a software structure that contains a list of all the application program databases contained in the common database and their associated schemas. The data dictionary also contains a definition of each schema and the various types of data elements which are stored in memory along with data security information. The difficulty with existing data dictionaries is that they are static and cannot be changed except by the database administrator, who must recompile the database system and the data dictionary with each change that is made to these elements.

A computer system user is typically unaware of the underlying database management system architecture and has no ability to change this architecture except through the database administrator. The database management system also stores data in a form and format dictated by the database management system architecture. The data can be accessed only by requesting the data in a manner that is consistent with this form and format. Therefore, the computer system user must write database-dependent application programs (data form and format specific) to access the data stored in the database. This rigidity of prior art database management systems introduces a whole new set of problems since the user cannot obtain information describing the collection of all data residing in the database. The user also cannot obtain the information contained in the database in a form and organization desired by the user without extensive application programs created by software experts.

DESCRIPTION OF THE INVENTION

The subject database management system overcomes these limitations of existing systems by adding an active data dictionary to the basic database management system. The subject database management system provides the user with a model of the data dictionary, which data dictionary model is architecturally consistent with the model of the data stored in the database. The data dictionary itself contains data which defines the various schema and application program databases, and this data dictionary data can be modified as can the data contained in the common database. The data dictionary is not only a part of the database management system but is also a database itself. Therefore, the same general purpose data manipulation language which is used on the database data can also be used on the data dictionary data.

The user has access to a model of the data dictionary, which model provides the user with information on not only the definitions of each of the schemas but also the relationships of various segments of data, collections of data and the inter-relationships therebetween. The user can, through this database management system, obtain an overview of what data is available on the database and access all the data stored therein regardless of the form and format of the data. The subject database management system defines the inter-relationship of various collections of data and provides the user with an active data dictionary to reflect these relationships, thereby equipping the user with extensive information handling abilities not found in existing database management systems.

The user can also define an essentially unlimited number of data manipulation operations using the general purpose data manipulation language to control, reorder and query both the data dictionary as well as the underlying data which is controlled by the database management system. In this environment, the user can then write generic application programs independent of the logical ordering of the data on the database. These generic application programs access data in the database by using the general purpose data manipulation language to control the data dictionary. The data dictionary then becomes a resource to access the requested data in a form and format independent of the application program's entity-relationship data model. These capabilities and the significance of such capabilities will be explored in the detailed description of a particular implementation of this system.

BRIEF DESCRIPTION OF THE DRAWINGS

FIGS. 4-8 illustrate in schematic form various entity-relationship models and examples of the subject database management system;

DETAILED DESCRIPTION OF THE DRAWING

Figure 1:
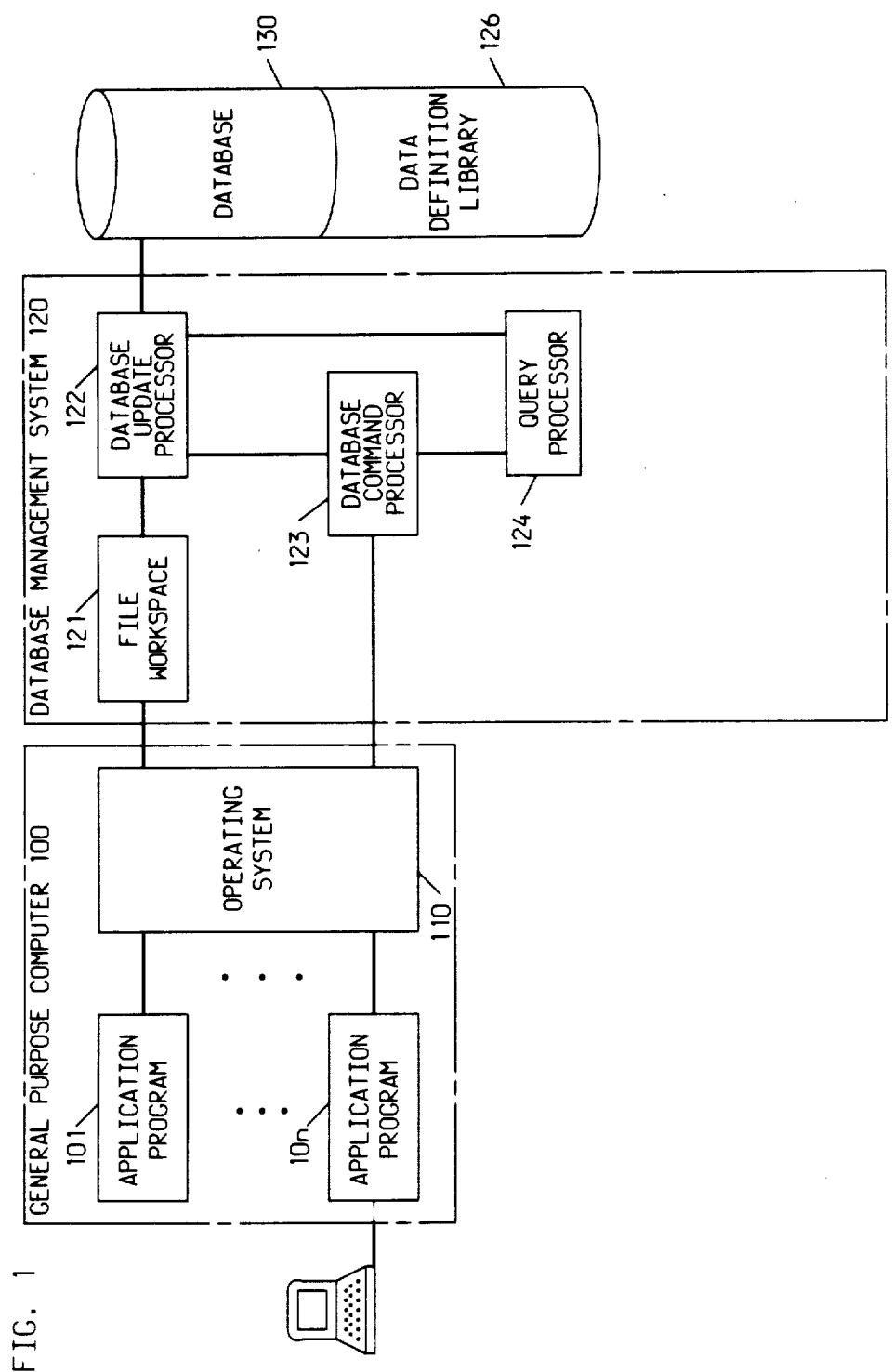
FIG. 1 illustrates in block diagram form the database management system of the subject invention.

The subject database management system with active data dictionary is illustrated in block diagram form in FIG. 1. This diagram schematically illustrates the functional pieces of both the subject database management system 120 and the general purpose computer system 100 with which it interacts. A general purpose computer 100 has an operating system 110 which controls the overall operation of general purpose computer 100. One attribute of an operating system that is of interest here is the interfacing between a number of application programs (101-10n) and the common database 130 shared by these application programs (101-10n). An application program (ex-101) requests data from database 130 by transmitting an interrupt or data I/O request to operating system 110. This request is forwarded by operating system 110 in well known fashion to database management system 120.

Access to all the data stored in database 130 is controlled by database management system 120. Database command processor 123 (Appendix C) of database management system 120 receives all requests from operating system 110 and decodes the requests. In the case mentioned above, the application program data request is decoded by database command processor 123 to ascertain the identity of the requesting application program and the data requested. This decoded information is forwarded by database command processor 123 to query processor 124 (Appendix E) which functions to obtain the identity of the physical location of the requested data in database 130. This translation is accomplished by query processor 124 accessing data definition library 126 (Appendix J) which is a software structure that contains a list of all the application program databases contained in database 130 and their associated schemas. Query processor 124 retrieves the identity of the various requested data elements from the schema stored in data definition library 126 (Appendix J) and can use this information to ascertain the physical location in database 130 wherein the requested data resides.

Query processor 124 transmits the physical location information to database command processor 123 which can then transfer the requested data from database 130 to buffer file 121 where application program 101 can access the requested data. This transfer is accomplished by database command processor 123 transferring the physical location information to database update processor 122 (Appendix G) which retrieves the requested data from database 130 and stores same in a designated segment of file buffer 121. Once this data transfer is accomplished, database command processor 123, via operating system 110, notifies application program 101 that the requested data now resides in a designated segment of buffer file 121 where application program 101 can retrieve the requested data.

Much of the illustrated structure is well known in the field of database management systems. The subject system differs from these known systems in the user-friendly nature and capabilities of query processor 124 and data definition library 126. These elements are accessible and modifiable by the user through a general purpose data manipulation language. The details of this structure are disclosed below. Before describing these elements in detail, a description of data files is provided.

Data Files

In computer systems, data must be stored in memory in an organized fashion. The typical data storage arrangement reflects the actual relationship among the various elements of data which need to be stored in the data processing system. For example, many collections of data reflect a hierarchical relationship among the various elements of data which are stored therein. This is typically a reflection of the relationship among the various elements with which the data processing system deals.

Figure 2:
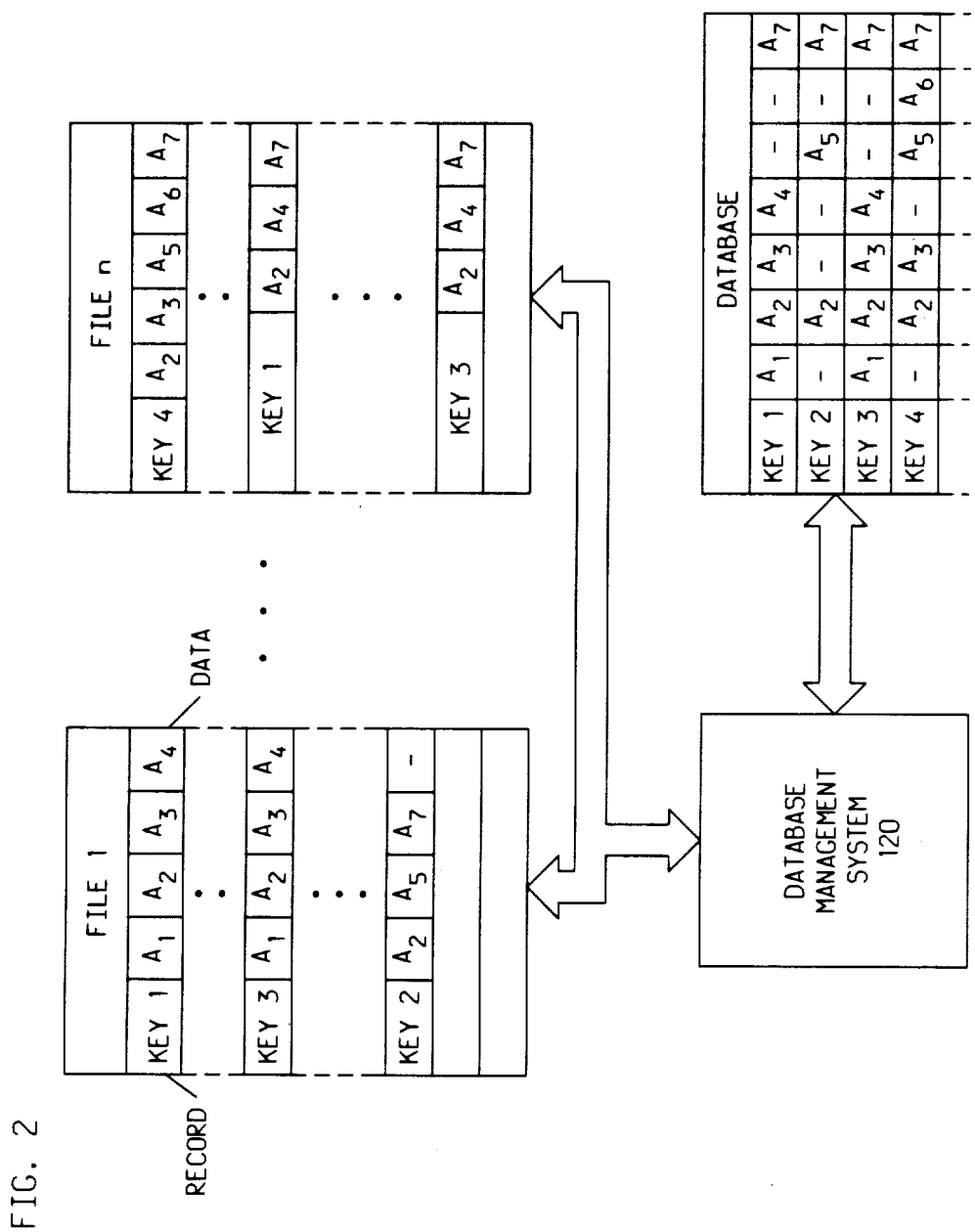
FIG. 2 illustrates the conventional data structure for a database management system.

A program running on the database will typically perform some operations on data which is related to a certain population. This population is composed of a plurality of individuals with each individual having a number of attributes which are necessary for the data processing task the computer must handle. FIG. 2 illustrates a typical data storage arrangement wherein a distinctive file is created for each computer program resident on the data processing system. The file is a reflection of a designated population wherein the file is comprised of a number of data segments, each of which is called a record. A record is a collection of the data relating to a particular individual in the population. The record in the data file is identified by a key name and is composed of a number of elements of data, for example A1 ... A4, which elements of data reflect actual values of the attributes that are of interest to the data processing operation.

Therefore, a file reflects the needs of the programmer who has created the particular program which must perform data processing operations on a subject population. In a large computer system there will be a number of programs, each of which has its own file system. If these file systems are related to the same or overlapping populations, it is obvious that there will be a significant amount of data redundancy. Therefore, database management systems function to eliminate the data redundancy by storing all data concerning all populations in a single nonredundant data file.

Data File Consolidation

This is illustrated in FIG. 2 wherein a number of files have been created with each file being comprised of a number of records, each of which is identified by a key name indicative of the individual associated with this record. As can be seen from FIG. 2, file 1 and file n share individuals in common (key 1, key 3) and these individuals have certain attributes that are of interest in common to both files. Therefore, database management system 120 creates a single database which contains an identifier of each individual of interest to any file system resident in the computer. Associated with this individual is also a listing of each element of data reflecting one of the attributes associated with this individual that is of interest to the one of the computer programs that has created one of the file systems.

The difficulty with this arrangement is that while individual elements of data are not redundantly stored in memory, there is no organized method of accessing all of the data stored in the database. In particular, the database management system will have stored therein a schema which is a definition of all of the attributes and individuals associated with a particular file system. A definition of the actual relationships among the various file systems is no where to be found in a typical database management system.

Figure 3:
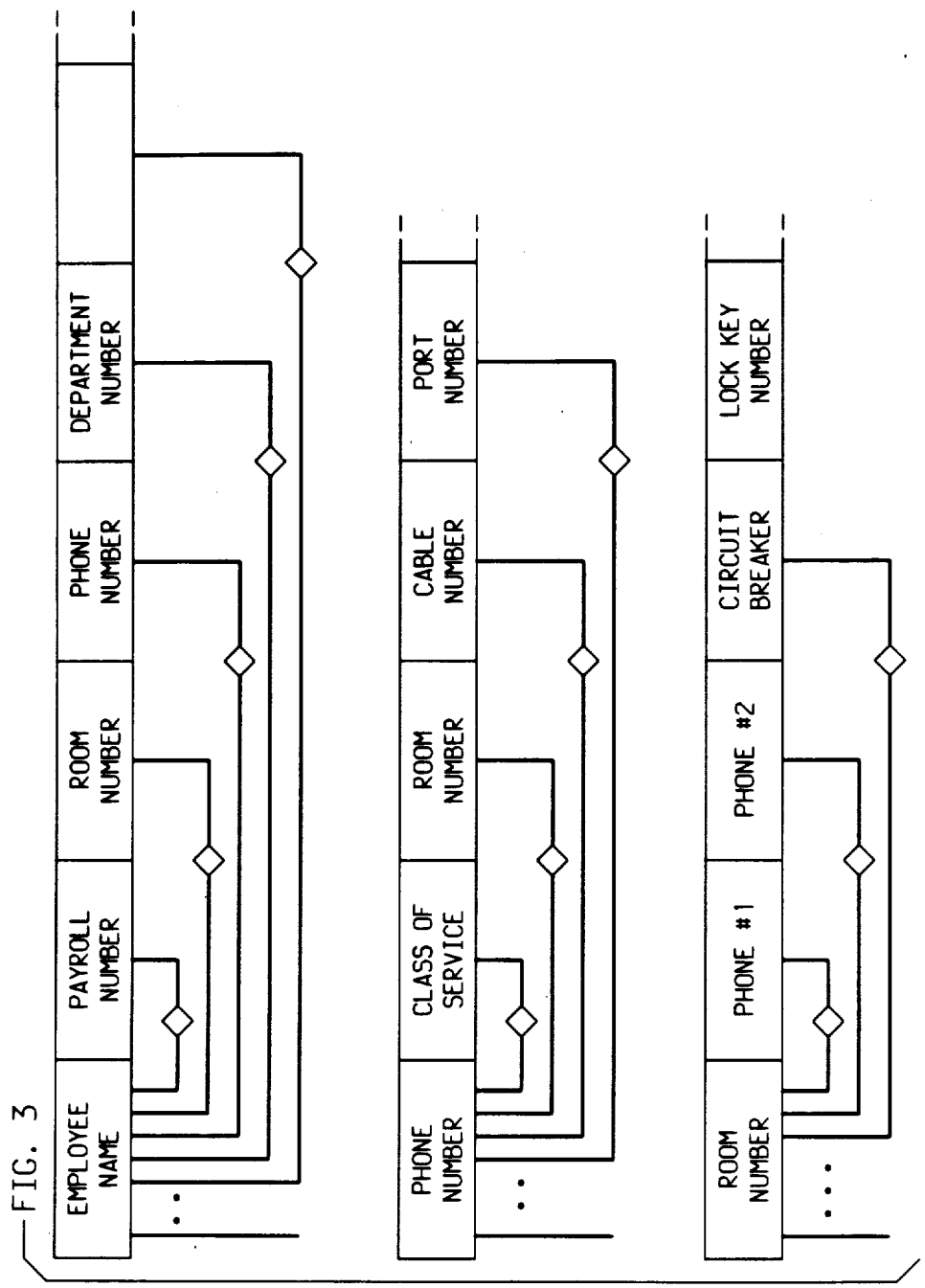
FIG. 3 illustrates in schematic form a number of different data files.

An example of this is the three file systems identified in FIG. 3 which obviously share a lot of common data. Without some indication of the relationship among these three file systems, the actual inherent value of all this data cannot be fully utilized. If one were to attempt to determine the class of service of a particular phone which is assigned to a named employee, the individual inquiring for this data would have to access the first file system which is organized by the key of employee name. Using the employee name, an individual can determine the phone number associated with this employee since the phone number is one of the attributes associated with the employee stored in this file system. With the phone number in hand, the individual would then have to access the second database or file system which is organized by the key identifier indicator of phone number. Using the acquired phone number, the individual can then access this file system with an inquiry as to the class of service attribute associated with the identified telephone number. Thus, several accesses are required to get a simple element of data out of the database system due to the fact that each file structure is independent of each other file structure and no where is there stored in the database management system an indication of the relationships among all the databases.

Active Data Dictionary

It is well known in the art to provide a data dictionary in any database management system. The data dictionary is simply the repository of information about the definition structure and usage of the data that is stored in the database management system. The data dictionary is essentially the outline of how the system is structured. The subject system provides an active data dictionary comprising query processor 124 and data definition library 126, which not only identifies the relationship among different entities in the data model, but also defines the relationship of the data model to the actual data. Therefore, since the user knows not only the organization of the data in every file system but also the interrelationship of the various file systems, a simple inquiry to query module 124 can produce the actual data required without going through multiple accesses of various file systems.

Application programs are written to have a specific view of data. This same view of data is also found in the data dictionary and must be consistent for all application programs. In this structure, there is a significant amount of redundancy between the software in the application program and the data dictionary. Furthermore, when data in the data dictionary needs to be modified or deleted, that data item must also be modified or deleted in all of the application programs which access that data item. Thus, application programs are database-dependent.

With the subject invention, application programs need not be written in data model dependent form and the application programs can use different data models. This implies that for any function, e.g., building management, personnel, payroll, inventory, budget, etc., only one generic application program need be written for any application. The generic application program directly queries the data dictionary via query module 124 to view or change the data item since the application program is logically independent of the data. The following examples illustrate the concept of this invention.

The subject invention is based on a hierarchy of entity-relationship models. It consists of three levels: (1) a main entity-relationship model, (2) a dictionary model, and (3) a data model. All three levels utilize the entity-relationship concept. With this hierarchical structure, the dictionary model serves as data to the main entity-relationship model, and the data model serves as data to the dictionary model.

Entity-Relationship Sets

FIG. 4 provides an example of entity sets and relationship sets. An entity is a thing that can be distinctly identified, e.g., a person or an employee is an entity that can be identified by name, social security number, etc.; an entity set is a group or set of things, e.g., a group or set of employees. A relationship is the association between entities. For example, consider two entity sets, employee and department. The association or relationship between an employee and a department is that an employee works for a department. Furthermore, an employee is not limited to working for one department but may indeed work for two or more departments (one to many) and a department may have two or more employees working for it (many to one). A relationship set is therefore a group or set of associations between entities. It is these different relationships or associations between employee(s) and department(s) that represent a relationship set.

Both entity sets and relationship sets have attributes and value sets. An attribute is a function that maps an entity set or relationship set into one or more value sets. In essence, an attribute identifies (or defines) various characteristics of an entity or a relationship, and a value set further identifies (or defines) the entity by populating these attributes with specific items of data which define these characteristics. Thus, the data model comprises a definition of the various entity sets and relationship sets. The data model contains these data definitions but no actual data. All the data is contained in the value sets or data file.

Consider the entity set department. An attribute of a department is department number, and value set for a department number is represented by some number of characters, (shown on FIG. 4 as 33100, 41738, 25061 . . .). Another attribute of the entity department is department name, and a value set for department name is represented by some number of characters (shown on FIG. 4 as Purchasing, Shipping, Legal . . . ). For the entity set employee, an attribute for an employee is employee social security number, and a value set for an employee social security number is represented by some number of characters. A separate data file contains the actual data, i.e., the actual social security numbers (shown on FIG. 4 as 103471170, 057031007, 21684222, . . . ). Employee name is another attribute of the entity employee; the value sets for employee name are a number of characters for the first name and a number of characters for the last name. A separate data file contains the actual data, i.e., the actual first and last names (shown on FIG. 4 as James Michaelson, Mary Farnsworth, Oscar Obermeier . . . ). The other attributes of an employee are represented by title, extension, room number, and salary, and their respective value sets are represented by title characters, extension characters, room number characters and salary characters. Again, a separate data file contains the actual data for all the attributes of title (shown on FIG. 4 as clerk, manager, expediter . . . ), extension (shown on FIG. 4 as 4173, 4001, 4268 . . . ), room number (shown on FIG. 4 as 12B, 07A, 04C . . . ), and salary (shown on FIG. 4 as 12,200.00; 32,400.00; 17,500.00; . . . ).

For the relationship set department-employee, an attribute may be project or assignment, and its corresponding value set is a number of characters representing the project or assignment. A separate data file contains the actual data for a project or assignment (shown on FIG. 4 as customer billing, payroll software, heating control software . . . ). If an employee works for different departments, another attribute for the relationship set department-employee is hours-worked for different departments and the corresponding value set is the number of hours worked for each department. A separate data file contains the actual hours worked (shown on FIG. 4 as 40, 37, 42 . . . ).

Entity-Relationship Model

As stated above, the data model contains data definitions but no actual data; the actual data is stored in a separate data file. The first thing that must be done in creating the subject database management system is to create and build a main entity-relationship model. The main entity-relationship model is developed using an off-line program (shown in Appendix A). When this off-line program is compiled, the entity-relationship model of the entity-relationship model is thereby initialized. An entity-relationship model for the entity-relationship model has the following characteristics:

It shows the associations between the entity sets and the relationship sets.

It shows which entity sets are dependent on which other entity sets.

It shows the associations of attributes and value-sets for an entity or relationship set.

If an entity or relationship set is deleted, its association with the other entity or relationship sets is automatically deleted. This requirement also applies to the dependent entity sets.

If an entity or relationship set is deleted, all associated attributes and value-sets are automatically deleted.

If an attribute is deleted, all associated value-sets are automatically deleted.

The primary key of a relationship set is automatically constructed by considering the association of this relationship set with the other entity sets.

Once initialized, the main entity-relationship model utilizes the data manipulation language of a standard database management system and allows one to define a dictionary model. Once the dictionary model is created data models are built. Only one main entity-relationship model and one dictionary model exists as opposed to n number of data models. For all the examples that follow, rectangular boxes represent entity sets and diamonds represent relationship sets.

FIG. 5 illustrates the main entity-relationship model. The main entity-relationship model consists of:

I-ERSET (502)—the entity set of all entity sets and relationship sets that form a dictionary model which is shown in FIG. 6. This includes ERSET, ASSOCIATION, DEPENDENCY, ERSET-ATTRIBUTES, and ATTRIBUTES.

I-ATTRIBUTES (505)—the entity set of all attributes contained in dictionary model. This includes attribute name, attribute type, entity-relationship name, if an entity or a relationship set, and entity-relationship type.

I-DEPENDENCY (501)—the relationship set of all dependencies for the set of all entities and relationships found in I-ERSET.

I-ASSOCIATION (503)—the relationship set of all associations between entities and relationships found in I-ERSET.

I-ER-ATTRIBUTES (504)—the relationship set between I-ERSET and I-ATTRIBUTES.

Dictionary Model

Once the ER model is built, one now constructs the dictionary model using screen interfaces that the entity-relationship model generates. The dictionary model is illustrated in FIG. 6. The dictionary model consists of:

ERSET (602)—the entity set of all entity sets and relationship sets that form a data model. For the example shown in FIG. 7, ERSET contains the entity sets Building, Rooms, and Exits and the relationship sets Building-Rooms and Exits-Rooms.

ATTRIBUTES (605)—the entity set of all attributes contained in a data model. For the example shown in FIG. 7, the entity set of ATTRIBUTES contains building number, building location, room number, room location, exit number, exit location, and exit type.

DEPENDENCY (601)—the relationship set of all dependencies for the set of all entities and relationships.

ASSOCIATION (603)—the relationship set of all associations between entities and relationships.

ER-ATTRIBUTES (604)—the relationship set between ERSET and attributes.

The following discussion assumes that a video terminal (CRT) is being used to apply this invention. With a video or screen interface you can define your data, build your data model, define all entity and relationship sets, and define and build all screen interfaces. In the subject system the screen model is part of the data dictionary. The following are the advantages that are derived by putting the screen definitions into the data dictionary.

Screen/report definitions are defined, updated, deleted and queried like data.

Screen/report definitions are linked with model information.

If an entity or relationship set is deleted, the corresponding screen/report definitions are also deleted.

If an attribute is deleted, the corresponding field definitions from the screens/reports are deleted. In this case, there will be a blank in the place of the deleted field when the screen/report is displayed.

When updates are made on the data, the model information associated with the screens is retrieved by querying the data dictionary. This leads to constructing the view dynamically to perform the update operations on the screens. This leads to designing a generic program to perform updates independent of the customer's model.

The definitions for the screens to define new screens are defined using this technique.

These screen interfaces are created by one of two methods. The first is a tightly coupled system arrangement where the entity set of ATTRIBUTES (505) is coupled to another entity set of FIELD DEFINITIONS which itself is coupled to an entity set of SCREEN. The user creates screen and field definitions using the application's view of the ER model. The dictionary model is generated using the field definitions for a particular application associated with these field definitions. The second method of retrieving model information is for the user to input scripts (ex-Appendix J) into the screen model so an application program can query the screen model to obtain this information. The scripts contain both model information and the method of dealing with screen variables such as ADD, DELETE.

Data Model

Now, one can construct the data model. FIG. 7 illustrates such a data model. As stated above, the structure of a data model is also based upon entity sets and relationship sets. Using a building management type model, as shown in FIG. 7, a data model is illustrated. Entity set 701, Building, contains the set of all buildings of a company. Attributes of this entity set can be building name, identification number and location. A second entity set 703, Room, contains the set of all rooms located in the set of all buildings. Attributes of this entity set can be room number, name, and location. A third entity set 705, Exits, contains the set of all exits for all the buildings in entity set 701. Attributes of this entity set can be exit function, number and location.

The relationship set 702, Building-Rooms, contains the set of all relationships between buildings and rooms. Attributes of this relationship are what rooms are located in what building, what are the physical location of the rooms in a building, etc. A second relationship set 704, Building-Exits, contains the set of all relationships between the exits and the building. Attributes of this relationship set are function to identify which extis for a building are used only for emergencies, such as fires, or which exits are used for deliveries or which exits are used as general entrances and exits. A third relationship set 706, Exits-Rooms, contains the set of all relationships between exits and rooms. Attributes of this relationship set are the identification of which is the closest exit from a room and which is the best or required exit from some room for emergency purposes such as fire.

To update the data model, one can use a screen interface to add, for example another entity set and relationship set. FIG. 8 illustrates such an addition. Here, the entity set 808, Employee, is added. This entity set contains the set of all employees. Attributes of this entity set are employee name, telephone number, etc. The relationship set 807, Building-Employee, contains the set of all relationships between employees and building. An attribute of this relationship set is the specific building where each employee is located. A second relationship set 809, Employee-Rooms, contains the set of all relationships between employees and rooms. An attribute of this relationship is which room is assigned to an employee.

To update a data model by the addition of entity and relationship sets, the subject invention provides the ability to define screen interfaces. The screen interface consists of field names and blank fields where appropriate data is defined. The screen fields are treated as data as well and a separate data model is built for the screen. For example, "employee screen" represents an entity and its attributes are employee first name and last name, and the value sets for this attribute are a number of characters for first name and last name and physical location of this field on the employee screen.

The above examples discuss only decimal and character type data. However, the subject invention is not limited to decimal and character data. Integration of text, graphics, and voice as data is possible. Such integration is possible by building a operator-type entity set. This entity set defines the operations and routines that are required to handle the different data types. Furthermore, this operator entity set would use the same data manipulation language as the data dictionary and the database management system.

Database Management System—Creation/Modification

Figure 9:
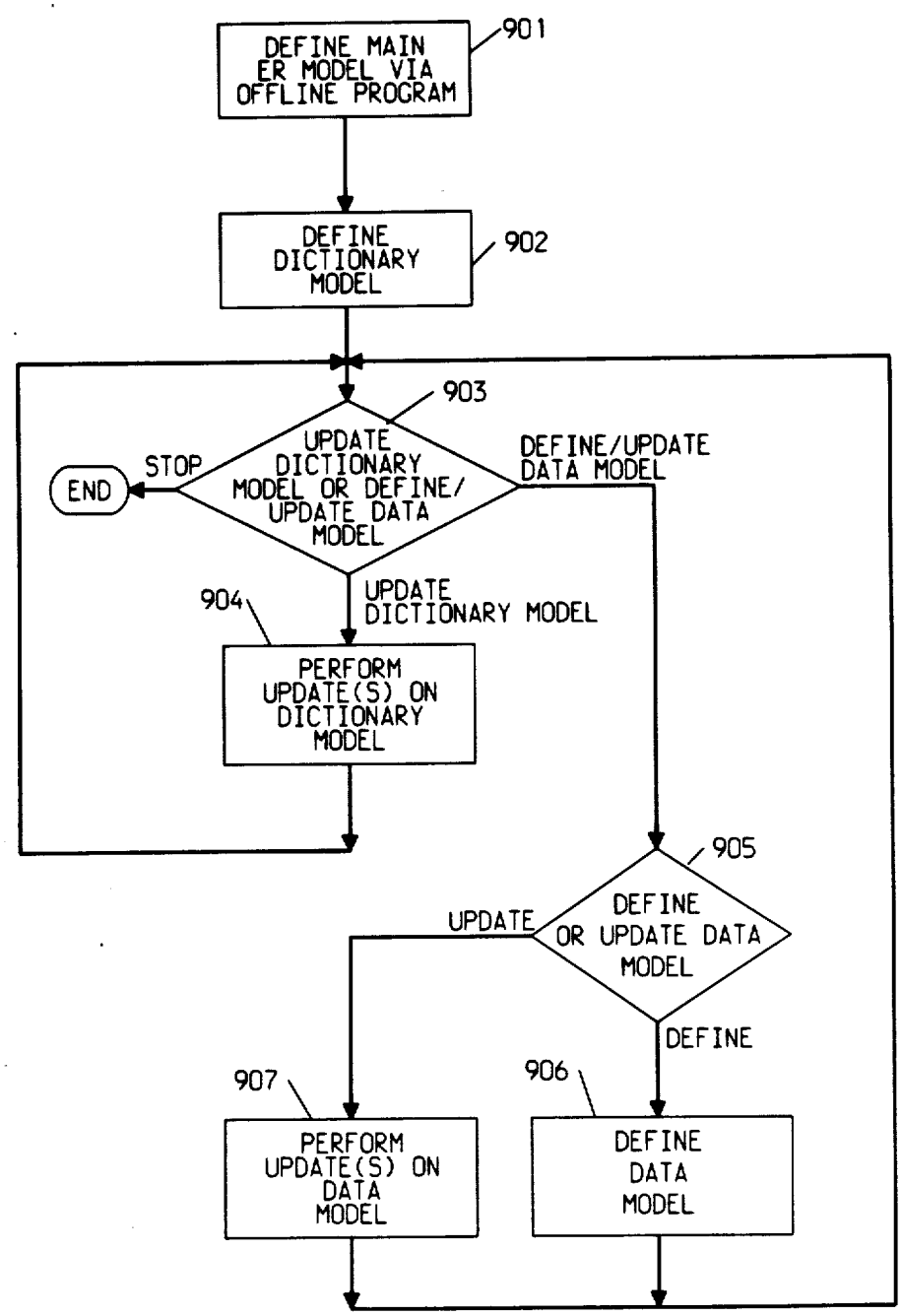
FIG. 9 illustrates in schematic form the process of constructing a database/database system.
Figure 10:
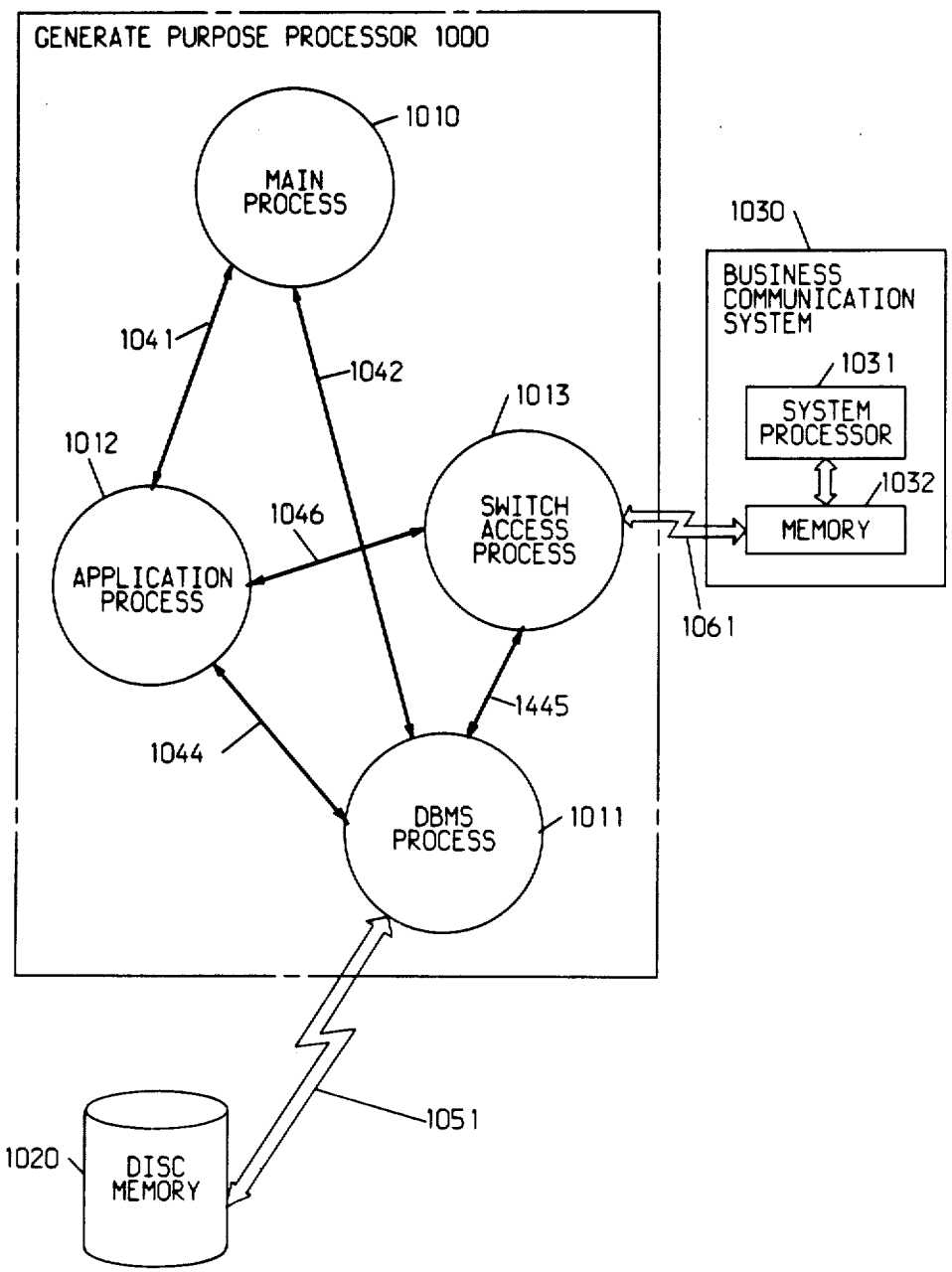
FIG. 10 illustrates in schematic form a facilities management application of the subject database management system for a business communications system.

FIGS. 9 and 10 illustrate the overall concept of constructing the database management system with active data dictionary. The use of a CRT is assumed in the construction of the database management system with active data dictionary. First, the main entity-relationship model must be constructed. This is done via an off-line program (step 901—Appendix A). In addition to constructing the main entity-relationship model, the off-line program also constructs the on-line menu-type, i.e., form-type, screens displayed on a CRT for constructing the dictionary model and the data models. Once the main entity-relationship model is constructed, it is stored in active data dictionary 125 (Appendix F) and the dictionary model can be constructed, using the menu-type screens (step 902—Appendix B). The main entity-relationship allows one to construct the dictionary model. The dictionary model contains the entity and relationships sets that form each and all of the data models. In addition, the dictionary model may contain security-type entity and relationship sets that may be used to restrict access to some or all data.

After constructing the dictionary model, it is also stored in active data dictionary 125 and one can either update the dictionary model or define data model(s) (Appendix C-G). If one chooses to update the dictionary model, the flowchart indicates the proper flow of the procedure (steps 903 and 904). The process continues and returns to step 903, where one can again choose to either update the dictionary model or define/update a data model(s). If one chooses to define a data model, the flowchart indicates the proceeding steps (steps 905 and 906). When defining a data model, assuming the use of a CRT, the generic application program in conjunction with the database management system creates a menu-type screen on a CRT that will query you on whether you wish to define a new entity set or relationship set, or update an existing entity set or relationship set. If one chooses to define a new entity set, one can specify the new entity set by selecting the appropriate option given on the CRT. Assuming the example used in FIG. 7, one can type "Building" as the name of a new entity set. Next, the system queries on defining the attributes of the new entity set "Building". Here, one defines the attributes by typing an attribute name, "building name" and specifying the maximum alphanumeric characters for a building name, e.g., 7 characters which allows for names such as, Tower 1, Tower 2, etc. The actual name of a building, e.g., Tower 1, is kept in a separate data file. One continues to define the attributes for "Building" by typing the name of another attribute, "identification number", and specifying the maximum alphanumeric characters for identification number, e.g., 5 characters which allows for numbers such as, 1001, 1002, etc. Again, the actual identification numbers are kept in a separate data file. The process returns to step 903 for additional updating and/or defining.

A second entity set, "Room" (from FIG. 7), can now be defined. The entity-set, "Room", is typed in as the name of the entity set to be defined. The attributes for the entity set "Room" are next defined. One defines these attributes by typing the name of an attribute, "room number", and specifying the maximum alphanumeric characters for a room number, e.g., 4 characters which allows for numbers such as, 2001, 2002, 3001, 3002, etc. The actual room numbers are kept in a separate data file. Another attribute for defining the entity set "Room" is "room name". After typing in "room name", one can then specify the maximum alphanumeric characters for a room name, e.g. 7 characters which allows for names such as, conf 1, library, maint 1, etc. Once this second entity set has been defined, the process returns to step 903.

Another entity set, "Exits", can be defined by typing the name "Exits". To define the attributes of the entity set, "Exits", one can type the name of the attribute, "exit type", and specifying the maximum alphanumeric characters for an exit type, e.g, 12 characters, which allows for names of exit types such as, fire 1, delivery 2, general 2, etc. After the "Exit" entity is defined, the process returns to step 903.

One can now define a new relationship set by selecting the appropriate option offered on the CRT screen. In response to the selection for defining a new relationship set, the system displays a screen for specifying the name of the new relationship set. Again, in accordance with the example of FIG. 7, one can type the name of the new relationship set, "Building-Rooms". The attributes for "Building-Rooms" must be defined next. One defines the Building-Rooms attributes by typing the name of the attribute, "Room in which building", and specifying the maximum alphanumeric characters that may represent the actual data of "Room in which building" found in a data file. Another attribute for Building-Rooms may be defined by typing "Physical location of room in a building" and then specifying the maximum alphanumeric characters that may represent the actual data of "Physical location of room in a building" found in a data file. The process again returns to step 903.

The next step would be to define the relationship set "Building-Exits" by typing the name of the relationship set, "Building-Exits", and specifying the attributes. Again, to specify the attributes, one can type "function to identify emergency and general exits" and specifying the maximum alphanumeric characters for the "function to identify emergency and general exits in a building" found in a data file as an algorithm. The process returns, again, to step 903.

Finally, in accordance with the example in FIG. 7, the relationship set "Exits-Rooms" is specified by typing "Exits-Rooms" as the name of the relationship set. The attributes of "Exits-Rooms" relationship are defined as typing the name of the attribute, "Function to identify all exits in relation to a room" and specifying the maximum alphanumeric characters that represent the "Function to identify all exits in relation to a room" found in some data file as an algorithm. The process returns to step 903.

If one chooses to update a data model(s) the process follows steps 905 and 907. Once all updates and definitions are completed, the process ends until other updates or definitions need to be performed.

Change Management System

The software of Appendix A-J and FIGS. 9 and 10 illustrate a specific application of the subject invention wherein a business communication system 1030 such as an AT&T System 85 is connected via a data link (shown conceptionally as arrow 1061) to general purpose processor 1000. Business communication system 1030 includes a system processor 1031 and an associated memory 1032. Business communication system 1030 serves a number of terminal devices (not shown) and the description of these terminal devices is stored in memory 1032. This description includes terminal type, features assigned, extension number, equipment location, line group, etc. To manage changes to the database which comprises this set of descriptions is a significant task.

The subject database management system is implemented as a C-language process 1011 on general purpose processor 1000, as is main process 1010, application process 1012 and switch access process 1013. C is a well-known programming language which runs on the UNIX TM operating system of general purpose processor 1000. Each process can be thought of as a stand-alone C-language program. The software of general purpose processor 1000 reads standard input, writes standard output and interprocess communication is accomplished through the communication device on UNIX known as pipes (1041-1046).

These processes (1010-1013) cooperatively operate to provide a change management function for business communication system 1030. To implement this change management function, a user must first create an application process 1012, the subject database management system process 1011, and a switch access process 1013. This is accomplished by the user (ex-business communication system administrator) inputting a main process (1010—Appendix A) which functions to create (step 901 of FIG. 9) processes 1011-1013. The user then inputs the software (Appendix B-G) to implement elements 122-125 of database management system 120. File workspace 121, data definition library 126 and database 130 are memory segments on disc memory 1020 which general purpose processor 1000 allocates to database management system process 1012. Similarly, the user inputs software to implement application process (1012—Appendix H) and switch access process (1013—Appendix I). General purpose processor 1000 creates UNIX pipes 1041-1046 to enable processes 1010-1013 to communicate.

The user accesses application process 1012 to create the change management database. This is accomplished by application process 1012 communicating with database management system process 1011 via UNIX pipe 1044. Database management system process 1011 accesses script files (Appendix J) stored on disc memory 1020 via a data link (shown conceptually as arrow 1051) to create a screen creation screen on the user's CRT (not shown). The user can then respond to the prompts/options provided on this screen to create a data dictionary model and a data model (steps 901–907 on FIG. 9) via database management system process 1011.

The user then makes use of the resultant data model and the input screens created (examples in Appendix J) to populate the database with data describing the terminal equipment served by business communication system 1030. This data, the data models, and screen definitions are all stored by database management system process 1011 as data on disc memory 1020. The user transfers the terminal equipment data to memory 1032 of business communication system 1030 via switch access process (1013—Appendix I) which reads the terminal equipment data from disc memory 1020 and transmits it to memory 1032.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A database management system which runs on a computer serving a plurality of users and which interfaces a plurality of user application programs to a database for managing sets of data stored on said database comprising:

data dictionary means for specifying relationships between each of said user application programs and said sets of said data stored in said database associated with each of said user application program;

data model means for controlling the definition of the specified relationships of said data dictionary;

query means responsive to change commands from a user application program for modifying said data model;

wherein said query means includes means responsive to said change commands for changing said data dictionary to correspond to said data model changes; and said query means further includes means responsive to a data request from said user application program for accessing the requested sets of said data from said database.

2. A database management system for interconnecting a plurality of user application programs with a database containing sets of data associated with said user application programs comprising:

data dictionary means for maintaining a list of the sets of said data associated with each of said application programs;

data model means for controlling the generation of said list by defining the logical relationships of said list;

query means responsive to change commands from a user application program for modifying said data model;

wherein said query means is additionally responsive to said change commands for changing said data dictionary to correspond to said data model changes; and said query means further responsive to a data request from said user application program for accessing the requested sets of said data.

3. A method of modifying a database management system which runs on a computer serving a plurality of users and which interfaces a plurality of user application programs to a database for managing sets of data stored on said database having a data dictionary which specifies relationships between a plurality of user application programs and the sets of said data stored in said database associated with each of said plurality user application programs and a data model which controls the definition of said data dictionary relationships and said database management system having a query processor that allows said plurality of application programs to access and modify said database, comprising the steps of:

modifying said data model by one of said applications via said query processor;

automatically making changes by said query processor to said data dictionary to correspond to said data model modifications; and accessing sets of said data by said one of said application programs via said query means.

4. A method of modifying a database having a data dictionary which describes the attributes of the data stored in the database, a data model which describes the characteristics of the data dictionary by defining relationships between said data dictionary and said attributes and a query processor that allows a plurality of application programs to access and modify said database, comprising the steps of:

modifying said data model by one of said plurality of application programs via query processor;

automatically making corresponding modifications to said data dictionary by said query processor in response to said data model modifications; and accessing said data of said database by said one of said plurality of applications programs via said query processor.

5. A database management system which runs on a computer serving a plurality of users and which interfaces a plurality of user application programs to a database for managing the data stored on said database comprising:

database change processor means connected to said database;

data definition library means for maintaining a list of the ones of said data associated with each of said application programs;

wherein said database change processor means is additionally connected to said data definition library means;

database command processor means responsive to change commands from said one of said application programs for routing said change commands to said query processor means;

query processor means responsive to said change commands from said one of said user application programs for converting a data model change command to both a list change command to modify said list and a corresponding data change command to modify said data associated with said one user application program and to transfer a request to said database change processor for database locations to be modified for said list and associated data;

said database change processor means responsive to said request for identifying said locations and to transfer the identified locations to said query processor means; and said query processor means responsive to said identified locations for modifying said associated data and said list via said database command processor means and said database change processor means.

* * * * *